Figure 1:
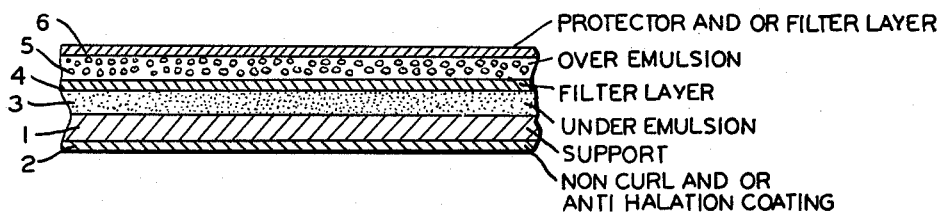

Dec. 29, 1964　　　　　　A. J. DERR　　　　　　3,163,533
PHOTOGRAPHIC PROCESS AND COLOR FILM FOR USE THEREIN
Filed Dec. 28, 1959　　　　　　　　　　　　　　4 Sheets-Sheet 1

*INVENTOR.*
ALBERT J. DERR
BY
ATTORNEYS

Dec. 29, 1964  A. J. DERR  3,163,533
PHOTOGRAPHIC PROCESS AND COLOR FILM FOR USE THEREIN
Filed Dec. 28, 1959  4 Sheets-Sheet 2

INVENTOR.
ALBERT J. DERR
BY
ATTORNEYS

Dec. 29, 1964  A. J. DERR  3,163,533
PHOTOGRAPHIC PROCESS AND COLOR FILM FOR USE THEREIN
Filed Dec. 28, 1959  4 Sheets-Sheet 3

INVENTOR.
ALBERT J. DERR
BY
ATTORNEYS

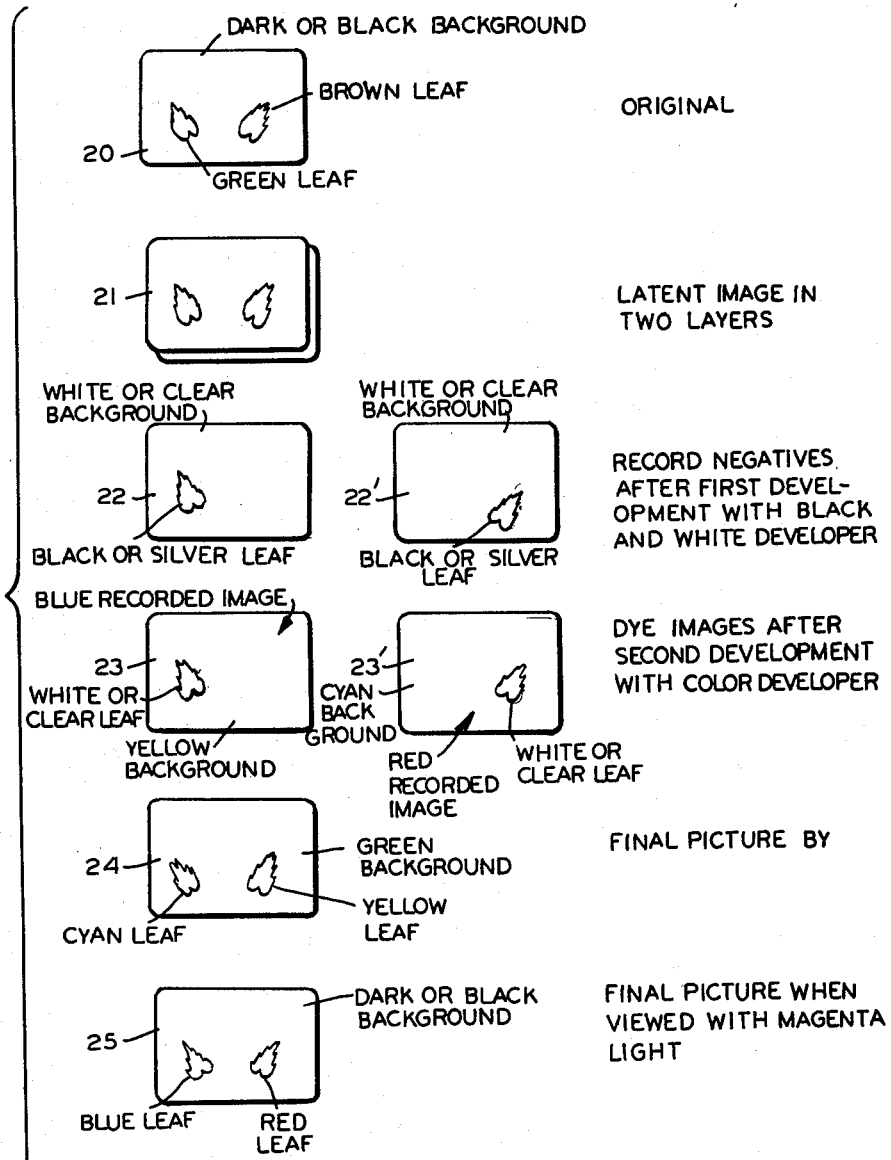

United States Patent Office 3,163,533
Patented Dec. 29, 1964

3,163,533
PHOTOGRAPHIC PROCESS AND COLOR FILM
FOR USE THEREIN
Albert J. Derr, Binghamton, N.Y., assignor to General Aniline & Film Corporation, New York, N.Y., a corporation of Delaware
Filed Dec. 28, 1959, Ser. No. 862,253
2 Claims. (Cl. 96—74)

This invention relates to a photographic process and to a color photographic element and in particular to a color film for use therein whereby the natural colors of an object which is photographed are reproduced in other than the natural colors, which other colors give greater visual discrimination than do the natural colors. The novel process and the film of this invention have special utility in photoreconnaissance work.

It is well known to use a color photographic element containing on a support three emulsion layers having suitable spectral sensitivity characteristics which, upon exposure and color development, yield a color reproduction of the original scene such that each object in the original scene will be recorded in the same color in which it was originally perceived visually.

Except for incidental changes for improving sharpness and haze penetration, color photographic film used by the military and other organizations for photoreconnaissance purposes has been this same type of color film which yields reproductions wherein the colors of various objects are recorded in the same colors in which they were originally perceived visually by the observer.

It is obvious that discrimination between two objects having different colors is no greater in the reproduction which faithfully recorded these colors than in the original scene itself.

This is particularly of interest in discriminating green leaves of natural foliage and brown leaves of dead or destroyed foliage. Green and brown are harmonious colors and their relationship among all colors capable of being perceived by the human eye is such that they do not lend themselves to maximum visual discrimination.

It is an object of this invention to provide a novel color photographic process and color photographic element for improving discrimination between objects of different colors, the natural colors of which objects do not yield maximum visual discrimination.

It is a further object of this invention to provide a photographic color film which is capable of reproducing the objects of an original scene in colors different from those naturally visually perceived and having greater visual discrimination than do the natural colors of the original scene.

A still further object of this invention is to provide a photographic color process and a color film for use therein for improving the visual discrimination between green and brown foliage as well as intermediate hues of the decay process in reproductions by reproducing the green foliage color in blue and the brown foliage color in red.

Other objects and advantages of this invention will become apparent to those skilled in the art from the detailed description thereof given below.

The objects and advantages of this invention are attained by producing a color photographic element comprising a base having thereon an anti-halation coating and two or more color photographic emulsion layers which, on exposure to an optical pattern and developed in the presence of a color former or coupler and a primary aromatic developing agent, give rise to colored images. Each of these emulsion layers may or may not contain sensitizing dyes and/or filter and/or screening dyes and may or may not have an external filter layer coated thereon prior to the coating of the subsequent emulsion layer or layers. The sensitizing dyes, the filter dyes and the screening dyes are used for the purpose of adjusting the basic sensitivity of the photographic emulsion to a desired sensitivity which depends upon the colors of the objects to be distinguished. An additional filter or filters may be used over the lens of the camera used to photograph the scene. A filter or filters may be used over the lens of the camera in lieu of coating filter layers on the emulsion layers.

The photographic emulsion layers, which may contain suitable color formers upon exposure and processing, are capable of reproducing the subject photographed in colors, other than the original colors, for better visual discrimination. These color formers are of a type which will reproduce the desired colors directly in a reversal process or in a direct negative process or in a multiple stage reproduction such as a negative-positive process.

Figure 2:
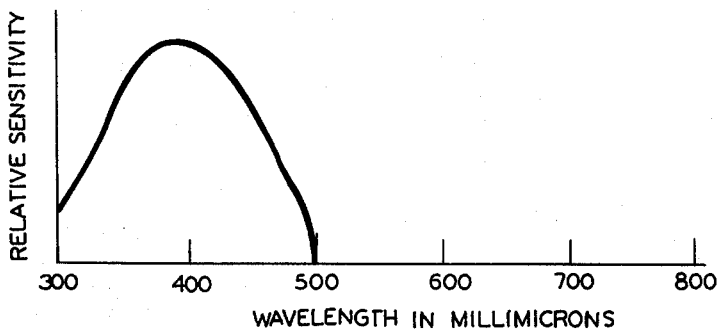
Figure 3:
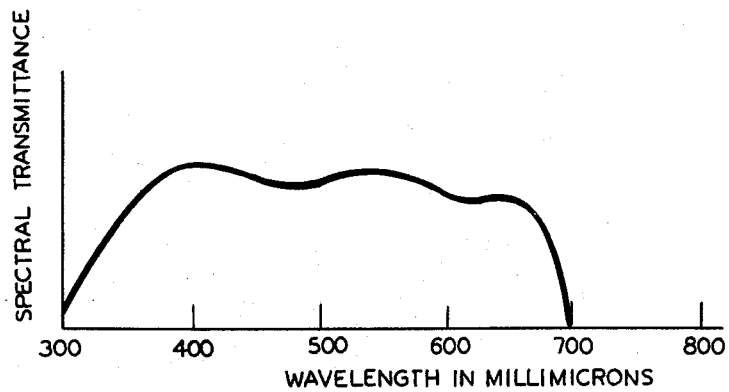
Figure 4:
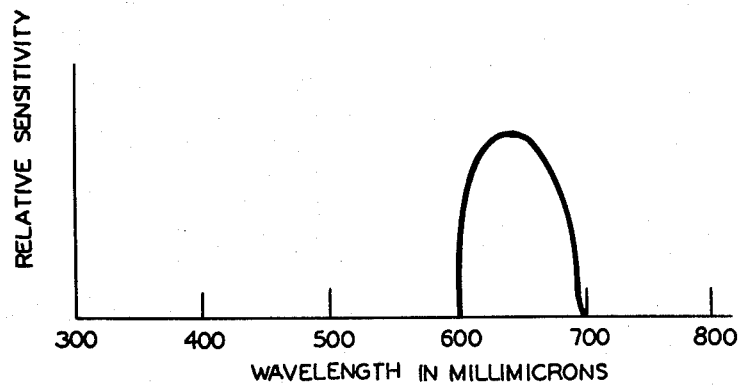
Figure 5:
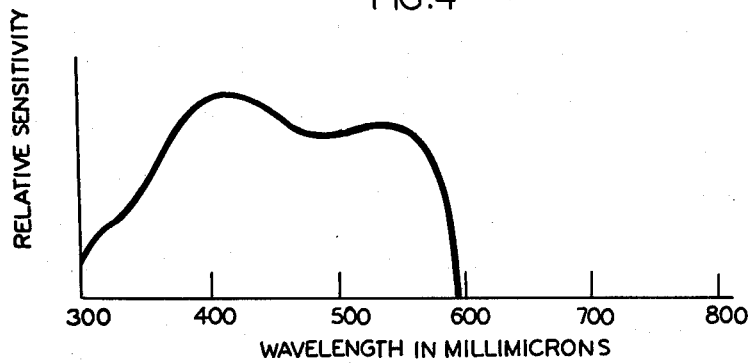
Figure 6:
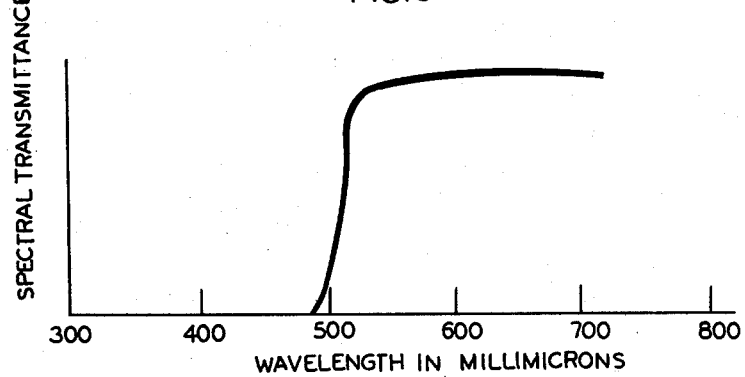
Figure 7:
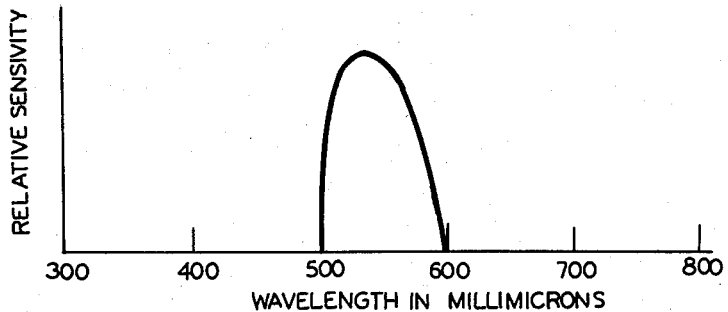
Figure 8:
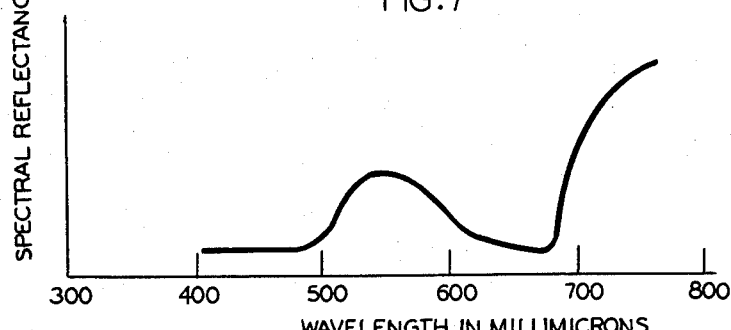
Figure 9:
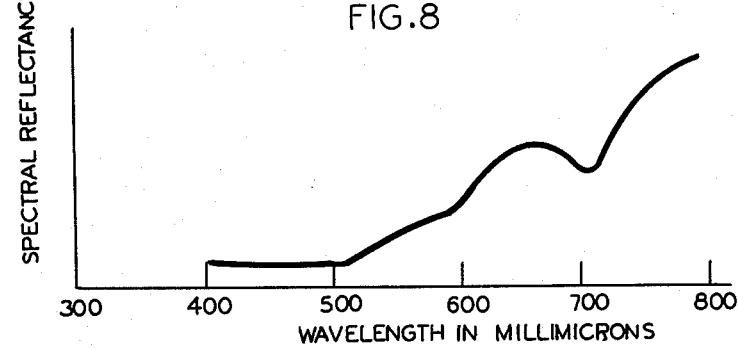
Figure 11:
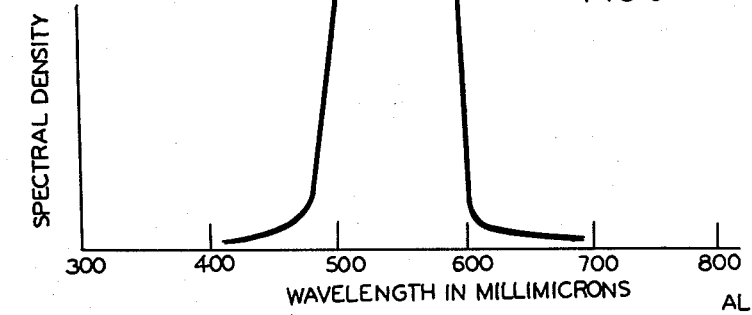

Referring to the drawing:
FIG. 1 is a cross-sectional view of the novel color film of this invention;
FIG. 2 is a graph showing the basic spectral sensitivity of the silver halide emulsion;
FIG. 3 is a graph showing the relative spectral sensitivity of the sensitized silver halide under smulsion;
FIG. 4 is a graph showing the relative spectral sensitivity of the sensitized silver halide under emulsion after the spectral sensitivity thereof has been modified by means of red and yellow filters;
FIG. 5 is a graph showing the relative spectral sensitivity of the over emulsion;
FIG. 6 is a graph showing the transmittance of a yellow filter layer which may be placed over the camera lens or coated on the film;
FIG. 7 is a graph showing the spectral sensitivity of the over emulsion after it has been modified by the yellow filter;
FIG. 8 is a graph showing the spectral reflectance of green leaves;
FIG. 9 is a graph showing the spectral reflectance of brown leaves;
FIG. 10 is a schematic view showing the film in the various stages of its processing; and
FIG. 11 is a graph of the spectral density of the filter used to view the finished film.

As shown in FIG. 1, the novel film of this invention comprises a base 1, which may be paper, glass, cellulose ester such as cellulose nitrate, cellulose acetate and the like or any other material commonly used as a base in photography. The base 1 is provided with anti-curling and anti-halation layer 2 which may be coated on one or both sides of the film. Over layer 2 is applied an under emulsion layer 3, which may be a typical silver halide photographic color emulsion containing a panchromatic sensitizing dye such as pinacyanol and a suitable cyan color former such as those described in U.S.P. 2,186,849 which, upon reversal color development, yields a density of cyan dye in inverse proportion to the amount of energy received by the emulsion layer. A red filter layer 4, such as, for example, a dispersion of the dye obtained from coupling p-diethylamino-o-toluidine with 3-heptaphenyl-1phenyl-5-pyrazolone in gelatin is coated on layer 3. Over filter layer 4 is emulsion layer 5, which is a typical silver halide photographic emulsion containing an orthochromatic sensitizing dye such as pinachrome and contains a coupler which yields a yellow dye image on color development. Suitable couplers for this purpose are described in the previously mentioned U.S.P. 2,186,849. The yellow filter layer 6 may comprise yellow colloidal silver incorporated in a gelatin carrier.

Alternatively, the yellow filter layer 6 may be replaced by a yellow filter such as a Wratten 12 used over the camera lens.

Other sensitizing dyes suitable for imparting orthochromatic and panchromatic sensitization to silver halide emulsions are described in the photographic literature and in this connection reference is made to U.S. Patents 2,068,047, 2,106,383 and 2,131,865.

With the construction shown in FIG. 1, the combination of red filter layer 4 and yellow filter layer 6 imparts the under emulsion 3 a spectral sensitivity between 600 and 700 millimicron wave lengths as shown by the curve in the graph of FIG. 4 and the yellow filter layer 6 imparts to the over emulsion layer 5 a spectral sensitivity between 300 and 600 millimicron wave lengths as shown by the curve in the graph of FIG. 5.

Green leaves reflect energy predominantly between 500 and 600 millimicron wave lengths as shown by the curve in the graph of FIG. 8 and brown leaves reflect energy predominantly between 600 and 700 millimicron wave lengths as shown by the curve in FIG. 9. Therefore, the layer 5 will be effected by the light predominantly reflected from the green leaves and the layer 3 will be effected by the light predominantly reflected from the brown leaves. On developing the latent images with a conventional reversible color processing technique, there will be formed in the top emulsion layer 5 a quantity of yellow dyestuff in inverse proportion to the amount of green light exposing this layer, i.e., where there is a large amount of green light there will be very little if any yellow dye formed, and where there is no green light to cause the formation of a latent image in the top emulsion layer 5, there will be developed the maximum amount of yellow dye.

Similarly, there will be developed in the bottom emulsion layer 3 a quantity of cyan dye in inverse proportion to the amount of red light exposing this layer.

The process of this invention is generally illustrated in FIG. 10. In this figure, 20 shows an original scene as, for example, a green and a brown leaf. Upon exposure of the novel film of this invention, latent images of these leaves are reproduced in the upper and lower emulsion layers 5 and 3 respectively as shown at 21. Negative black and white images are produced in both emulsion layers after the first development as shown at 22 and 22'. After color development, positive dye images of the colors of the original scene are formed in the layers which they particularly effect. This is shown at 23 and 23'. The combination of the two dye images produce the final transparency as shown at 24. When this picture is viewed with a magenta light such as that produced with a Wratten 32 filter or other filter having a spectral density characteristic as shown in FIG. 11, the picture appears with the green leaf of the original scene in blue and the brown leaf of the original scene in red as shown at 25. Red and blue are more easily distinguishable from each other than are brown and green.

As a modification of the film shown in FIG. 1, the red filter layer 4 may be replaced with a magenta filter layer having a spectral density characteristic as shown in FIG. 11 which, in conjunction with the yellow filter layer 6, will produce the proper spectral sensitivity as, for example, 600 to 700 millimicron wave lengths in the emulsion layer 3. If this dye is not discharged during processing, it will remain as an inherently contained viewing filter and the use of a separate magenta filter for viewing the film becomes unnecessary.

In the aforedescribed embodiment of my invention, the color formers are incorporated directly in the emulsion and, as a consequence, must be of the non-wandering or non-diffusing variety which are described in the previously cited U.S.P. 2,186,849. However, the couplers may be included in the developer. If this be the case, the couplers must be of sufficient mobility in order to diffuse from the developer bath into the light sensitive silver halide layers. In other words, a diffusing coupler is required such as, for instance, those disclosed in U.S. Patents 2,407,210 and 2,474,293.

Various photographic developing agents can be employed with the couplers of my invention. The primary aromatic amino developing agents generally suitable include the phenylenediamines and aminophenols. The alkyl phenylenediamines may be substituted in the amino group as well as in the ring. Suitable compounds are 4-aminoaniline, 4-ethylaminoaniline, 2-diethylaminoaniline, 4-dialkylaminoaniline, e.g., 4-dimethylaminoaniline, 4-diethylaminoaniline, 4-[N - ($\beta$ - hydroxyethyl) - N - ethyl]-aminoaniline, 4 - amino-N-ethyl-N-($\beta$-methanesulfonamidoethyl)-2-methylaniline sulfate, and the like. The above developing agents are preferably used in the form of their salts such as the hydrochloride or hydrosulfate as they are more soluble and stable than the free bases. All of these compounds have a primary amino group which enables the oxidation product of the developer to couple with the color compounds to form dye images. After removal of the silver image by bleaching and fixing in a manner well known to the art, the color image remains in the emulsion. A suitable developing solution can be prepared as follows:

| | G. |
|---|---|
| 2-amino-5-diethylaminotoluene | 2 |
| Sodium carbonate (anhydrous) | 20 |
| Sodium sulfite (anhydrous) | 2 |
| Potassium bromide | 0.2 |
| Water to make 1 liter. | |

The exposed silver halide emulsions containing the color formers are developed in the above solution in the usual manner.

My invention is not limited to the detailed description thereof contained herein, but includes all modifications that fall within the scope of the appended claims.

I claim:

1. A photographic multilayer material suitable for photoreconnaissance purposes, comprising a suitable support provided on one side with an anti-halation layer and carrying on the side opposite said anti-halation layer in the following order the following layers: (1) a gelatin silver halide emulsion layer sensitive to red light having a wave length ranging from 600 to 700 millimicrons and containing a colorless color former capable of reacting with the oxidation products of a primary amino developing agent to form a cyan dye image, (2) a filter layer containing a magenta dye fast to diffusion and not capable of being discharged during processing, (3) a gelatin silver halide emulsion layer sensitive to green light having a wave length ranging from 500 to 600 millimicrons, and containing a color former fast to diffusion capable of reacting with the oxidation products of a primary aromatic amino developing agent to form a yellow dye image and (4) a top layer containing a yellow colorant capable of being removed during processing, the red-sensitive and the green-sensitive layers being the only silver halide emulsion layers present in the multilayer material.

2. A process having utility in photoreconnaissance work which includes improving the color discrimination between the green color of live growing foliage and the brown color of dead, destroyed foliage in a natural scene by photographing said scene onto a multilayer material comprising a suitable support provided on one side with an anti-halation layer and carrying on the side opposite said anti-halation layer, in the following order, the following layers: (1) a gelatin silver halide emulsion layer sensitive to red light having a wave length ranging from 600 to 700 millimicrons and containing a colorless color former capable of reacting with the oxidation products of a primary aromatic amino developing agent to form a cyan dye image, (2) a filter layer containing a magenta dye fast to diffusion and incapable of being discharged during processing, (3) a gelatin silver halide emulsion layer sensitive to green light having a wave length ranging from 500 to 600 millimicrons, said green-sensitive emulsion layer containing a color former fast to diffusion capable of reacting with the oxidation products of a primary aromatic amino developing agent to form a yellow dye image, and (4) a top layer containing a yellow colorant capable of being removed during processing, said red-sensitive and green-sensitive layers being the only silver halide layers in the multilayer material; thus recording by said exposure in the green-sensitive layer the green color reflected by the live foliage and recording the red color reflected by the dead foliage in the red-sensitive layer, thus forming latent silver images in the emulsion layers, processing said multilayer material by developing the latent images in a black and white developer to form negative silver images in the two emulsion layers, re-exposing said multilayer material and developing the residual silver halide in said multilayer material with a developer solution containing a primary aromatic amino developing agent to form a cyan dye image in the red-sensitive layer and a yellow dye image in the green-sensitive layer, removing the developed silver by bleaching, fixing and washing, removing by this process the yellow colorant from the top layer, thereby reproducing the green color of the fresh foliage as a blue image and reproducing the brown color of the dead foliage as a red image.

References Cited in the file of this patent

UNITED STATES PATENTS

| | | |
|---|---|---|
| 1,956,274 | Comstock | Apr. 24, 1934 |
| 2,251,365 | Miller | Aug. 5, 1941 |
| 2,402,786 | Stearns et al. | June 25, 1946 |
| 2,403,722 | Jelley et al. | July 9, 1946 |
| 2,927,019 | Woodward et al. | Mar. 1, 1960 |

FOREIGN PATENTS

| | | |
|---|---|---|
| 685,610 | Great Britain | Jan. 7, 1953 |

OTHER REFERENCES

Kodak Color Data Book, "Color as Seen and Photographed," pages 7–13, Eastman Kodak Co., Rochester 4, New York (1950).